United States Patent
Harbur et al.

(10) Patent No.: US 9,421,489 B2
(45) Date of Patent: Aug. 23, 2016

(54) DIESEL FUEL AND UREA TANK AIR BREATHER FILTER

(71) Applicant: Parker-Hannifin Corporation, Cleveland, OH (US)

(72) Inventors: Randy Harbur, Germantown, TN (US); John K. Nichols, Oxford, MS (US); Jon Wake, Modesto, CA (US); Daniel Copley, Oxford, MS (US); James Manley, Myrtle, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 127 days.

(21) Appl. No.: 14/309,400

(22) Filed: Jun. 19, 2014

(65) Prior Publication Data

US 2014/0373491 A1 Dec. 25, 2014

Related U.S. Application Data

(60) Provisional application No. 61/838,482, filed on Jun. 24, 2013, provisional application No. 62/004,593, filed on May 29, 2014.

(51) Int. Cl.
| | |
|---|---|
| *B01D 46/42* | (2006.01) |
| *B01D 46/24* | (2006.01) |
| *B01D 45/06* | (2006.01) |
| *B01D 46/00* | (2006.01) |
| *B01D 46/52* | (2006.01) |
| *B01D 50/00* | (2006.01) |
| *F01M 13/04* | (2006.01) |

(52) U.S. Cl.
CPC ........... *B01D 46/4272* (2013.01); *B01D 45/06* (2013.01); *B01D 46/0031* (2013.01);

(Continued)

(58) Field of Classification Search
CPC .. B01D 29/21; B01D 35/153; B01D 46/003; B01D 35/30; B01D 2201/613; B01D 2201/4046; A47L 9/127; A47L 9/1683
USPC ............ 55/310, 337, 318, 410, 490; 15/353; 210/418, 232, 235, 429, 437, 438, 450
See application file for complete search history.

(56) References Cited

U.S. PATENT DOCUMENTS

| | | | |
|---|---|---|---|
| 5,783,076 A | 7/1998 | Albers, Jr. | |
| 8,002,981 B2 * | 8/2011 | Bagci | B01D 35/153 210/232 |

(Continued)

FOREIGN PATENT DOCUMENTS

| | | |
|---|---|---|
| WO | 00/77352 A1 | 12/2000 |
| WO | 2013/075106 | 5/2013 |

OTHER PUBLICATIONS

Extended European Search Report for corresponding European Patent Application No. 14173506.8 dated Dec. 23, 2014.

*Primary Examiner* — Duane Smith
*Assistant Examiner* — Minh-Chau Pham
(74) *Attorney, Agent, or Firm* — Renner, Otto, Boisselle & Sklar, LLP

(57) ABSTRACT

Provided is a filter that filters air flowing from the filter to a downstream component, while preventing fluid from flowing from the filter to the downstream component and preventing a substance, such as urea or fuel, entering the filter from the downstream component from degrading the filter element in the filter. The filter includes a filter element having an interior surface defining an inner chamber and a standpipe extending through the inner chamber and terminating at a point that allows air that flows from outside the filter element through the filter element and into the inner chamber to flow into the standpipe and out of the filter, while preventing fluid flowing from the opposite direction through the standpipe from entering the filter element.

20 Claims, 6 Drawing Sheets

(52) U.S. Cl.
CPC ......... *B01D46/2403* (2013.01); *B01D 46/522* (2013.01); *B01D 50/002* (2013.01); *F01M 13/04* (2013.01); *B01D 2279/35* (2013.01); *F01M 2013/0438* (2013.01)

(56) References Cited

U.S. PATENT DOCUMENTS

| | | | |
|---|---|---|---|
| 8,043,503 B2 | 10/2011 | Clausen | |
| 8,753,436 B1 * | 6/2014 | Curtsinger | B01D 46/003 55/318 |
| 2003/0131858 A1 | 7/2003 | Patel | |
| 2006/0053756 A1 * | 3/2006 | Hawkins | B01D 29/21 55/310 |
| 2007/0084158 A1 * | 4/2007 | Fester | A47L 9/127 55/337 |
| 2008/0086836 A1 * | 4/2008 | Carr | A47L 9/1683 15/353 |
| 2010/0024366 A1 | 2/2010 | Hodges et al. | |
| 2010/0276358 A1 * | 11/2010 | Thomas | B01D 29/21 210/418 |
| 2011/0024344 A1 * | 2/2011 | Thomas | B01D 29/21 210/235 |
| 2013/0026090 A1 | 1/2013 | Johnson et al. | |

* cited by examiner

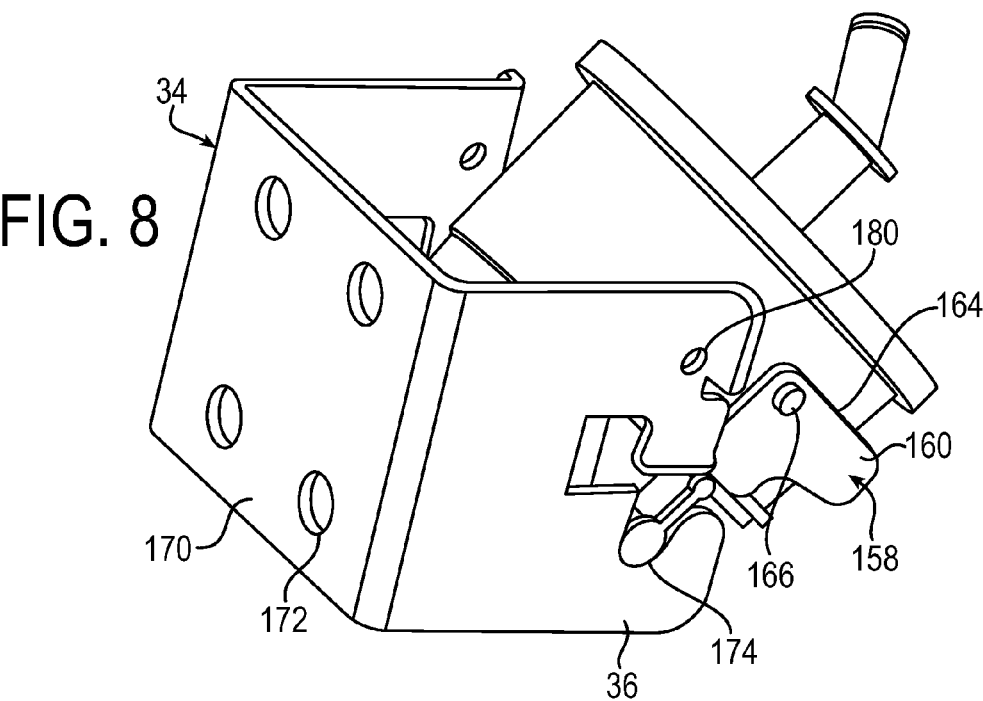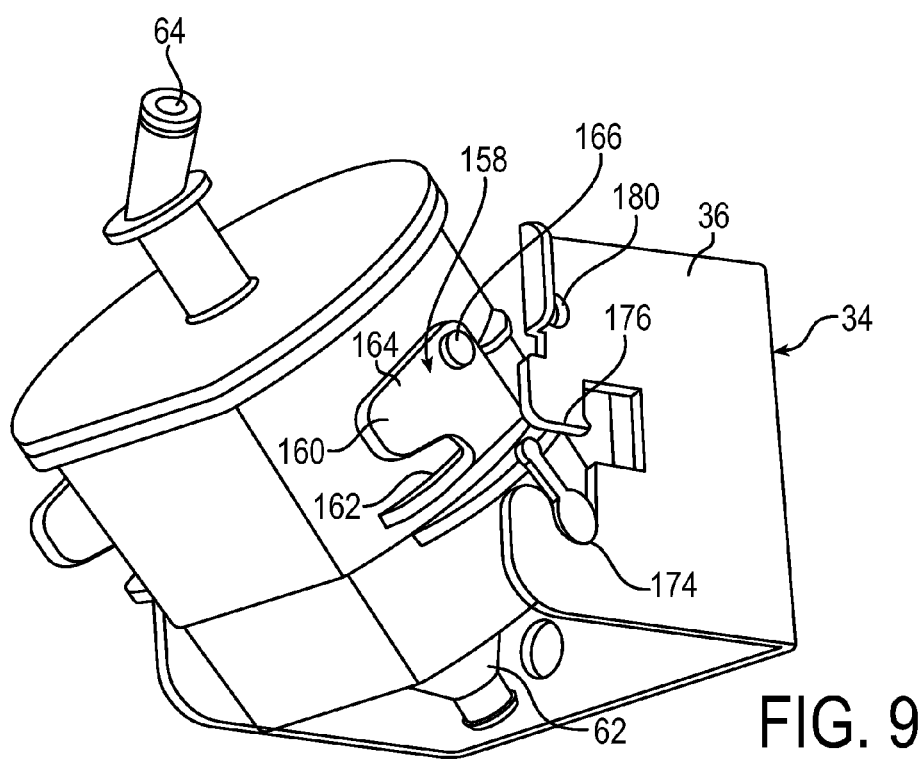

DIESEL FUEL AND UREA TANK AIR BREATHER FILTER

RELATED APPLICATIONS

This application claims the benefit of U.S. Provisional Application No. 61/838,482 filed Jun. 24, 2013 and U.S. Provisional Application No. 62/004,593 filed May 29, 2014, which are hereby incorporated herein by reference.

FIELD OF INVENTION

The present invention relates generally to an air breather filter, and more particularly to an air breather filter used on diesel fuel and urea tank systems on a vehicle.

BACKGROUND

Certain fluid filters are supported on a bracket (or other support device), and have a quick-release feature to allow the filter to be quickly and easily removed from such bracket. In a vehicle for example, such as a diesel engine powered vehicle, it can be desirable to have a bracket on the diesel engine, in the engine compartment, or other appropriate support location on the vehicle, and to have quick attachment means for mounting the filter to the bracket, and for removing the filter when it is desirable, for example, to access the filter remotely for repair, or for replacement of a spent element.

The diesel engine powered vehicles may be run with a lean burn air-to-fuel ratio to ensure the full combustion of soot and to prevent the exhaust of unburnt fuel. The excess of oxygen leads to the generation of nitrogen oxide from the nitrogen in the air, which is harmful to the environment. To reduce emissions from the diesel engine powered vehicles, urea tanks containing urea may be provided. The urea is delivered from the urea tank to an exhaust system of the vehicle where the urea is applied as a urea dose to the exhaust to react with and reduce certain pollutants contained therein, for example by scrubbing nitrogen oxide from the diesel exhaust.

SUMMARY OF INVENTION

The present invention provides a filter that filters air flowing from the filter to a downstream component, while preventing fluid from flowing from the filter to the downstream component and preventing a substance, such as urea or fuel, entering the filter from the downstream component from degrading the filter element in the filter. The filter includes a filter element having an interior surface defining an inner chamber and a standpipe extending through the inner chamber and terminating at a point that allows air that flows from outside the filter element through the filter element and into the inner chamber to flow into the standpipe and out of the filter, while preventing fluid flowing from the opposite direction through the standpipe from entering the filter element.

According to one aspect of the invention, a filter is provided that includes a housing circumscribing a central axis, the housing having an inlet at a lower end and an outlet at an upper end, a filter element disposed within an upper portion of the housing, the filter element having an interior surface defining an inner upper chamber and an exterior surface defining with an interior surface of the housing an outer upper chamber, a standpipe forming a passageway communicating at an upper end to the outlet and at a lower end to a lower chamber in the housing below the inner upper chamber, the lower end of the standpipe extending through the inner upper chamber to a point no higher than a lower exposed surface of the filter element, and a check valve that permits flow from the lower chamber to the inlet and blocks flow from the inlet to the lower chamber.

The lower end of the standpipe may extend through the inner upper chamber to a point below the lower exposed surface of the filter element. The inlet may communicate with the outer upper chamber such that air entering the inlet flows to the outer upper chamber.

The lower chamber may be formed by an annular interior wall radially inwardly spaced from the interior surface of the housing.

The filter further includes a lower end cap sealingly bonded to a lower end of the filter element and supported on a shoulder extending inwardly from the interior surface of the housing.

The lower end cap may have a body supported on the shoulder and a tubular portion extending from the body downward towards the inlet and defining the lower chamber, and wherein the tubular portion houses the check valve.

The filter may further include a plurality of openings defined between the interior surface of the housing and the body of the lower end cap, whereby air flows from the inlet through the openings to the outer upper chamber.

The lower end cap may include a recess for supporting a lower end of the filter element.

The recess may be defined by a radially outer wall and a radially inner wall of the lower end cap.

The radially inner wall may have a plurality of circumferentially spaced axial projections for preventing lobes of the filer element from collapsing.

The radially inner wall may include a plurality of gutters for allowing fluid to drain from the filter element to the inlet.

The filter element may be an extruded filter element.

The filter element may include a plurality of circumferentially spaced lobes.

The housing may include a canister and a cover coupled to the canister, and wherein the cover serves as an upper end cap and is sealingly bonded to an upper end of the filter element.

The standpipe may be integrally formed with the cover.

According to another aspect of the invention, a filter is provided having a housing circumscribing a central axis and including a canister having a closed end and an open end, the canister having a first port in the closed end that serves as an air inlet and a fluid/urea outlet, a cover attached to the open end of the canister, the cover having a second port that serves as an air outlet and a fluid/urea inlet and a standpipe extending axially from the second port towards the first port, and a filter element for filtering particulates from air flowing from the first port to the second port, the filter element having an interior surface defining an inner chamber, wherein the standpipe extends axially through the inner chamber from the second port towards the first port and terminates at a point that allows air that flows from outside the filter element through the filter element and into the inner chamber to flow into the standpipe and to the second port, while preventing fluid flowing from the second port through the standpipe from entering the filter element.

The standpipe may extend axially through the inner chamber and terminates at the point no higher than a lower exposed surface of the filter element.

The standpipe may terminate at the point below the lower exposed surface of the filter element.

The filter may further include a lower end cap sealingly bonded to a first end of the filter element and supported on a shoulder extending inward from an inner wall of the canister.

The lower end cap may have a body supported on the shoulder and a tubular portion extending from the body towards the first port and defining a lower chamber.

The filter may further include a check valve that permits flow from the lower chamber to the first port and blocks flow from the first port to the lower chamber.

The check valve may be housed in the tubular portion.

The cover may serve as an upper end cap and is sealingly bonded to a second end of the filter element.

According to still another aspect of the invention, a filter is provided that is connectable to a diesel fuel system or a urea tank system, the filter including a housing circumscribing a central axis, the housing having an inlet at a first end and an outlet at a second end, a filter element disposed within the housing, the filter element having an upper portion, a lower portion, and inner chamber defined therebetween, and a standpipe having an upper portion and a lower portion, the lower portion of the stand pipe extending into the inner chamber from the upper portion of the filter element towards the lower portion of the filter element and terminating above the lower portion of the filter element and below a lower exposed surface of the filter element.

The filter further includes an end cap sealingly bonded to the lower end of the filter element and supported on a shoulder extending inward from an inner wall of the housing.

The end cap may include a radially outer wall and a radially inner wall that define a recess for supporting the lower portion of the filter element The radially inner wall may substantially cover the lower portion of the filter element and the lower exposed surface of the filter element is above the radially inner wall.

The foregoing and other features of the invention are hereinafter described in greater detail with reference to the accompanying drawings.

BRIEF DESCRIPTION OF THE DRAWINGS

FIG. 8 is a perspective view of the filter being assembled to a support bracket.

FIG. 9 is another perspective view of the filter being assembled to a support bracket.

DETAILED DESCRIPTION

The principles of this present application have particular application to filter assemblies for removing particulates and other contaminants from an air stream entering a fuel tank and a urea tank, such as in a diesel vehicle, and thus will be described below chiefly in this context. It will of course be appreciated, and also understood, that principles of this invention may be applicable to other filter assemblies where it is desirable to remove particulates from air while protecting the filter from fluid.

Figure 1:
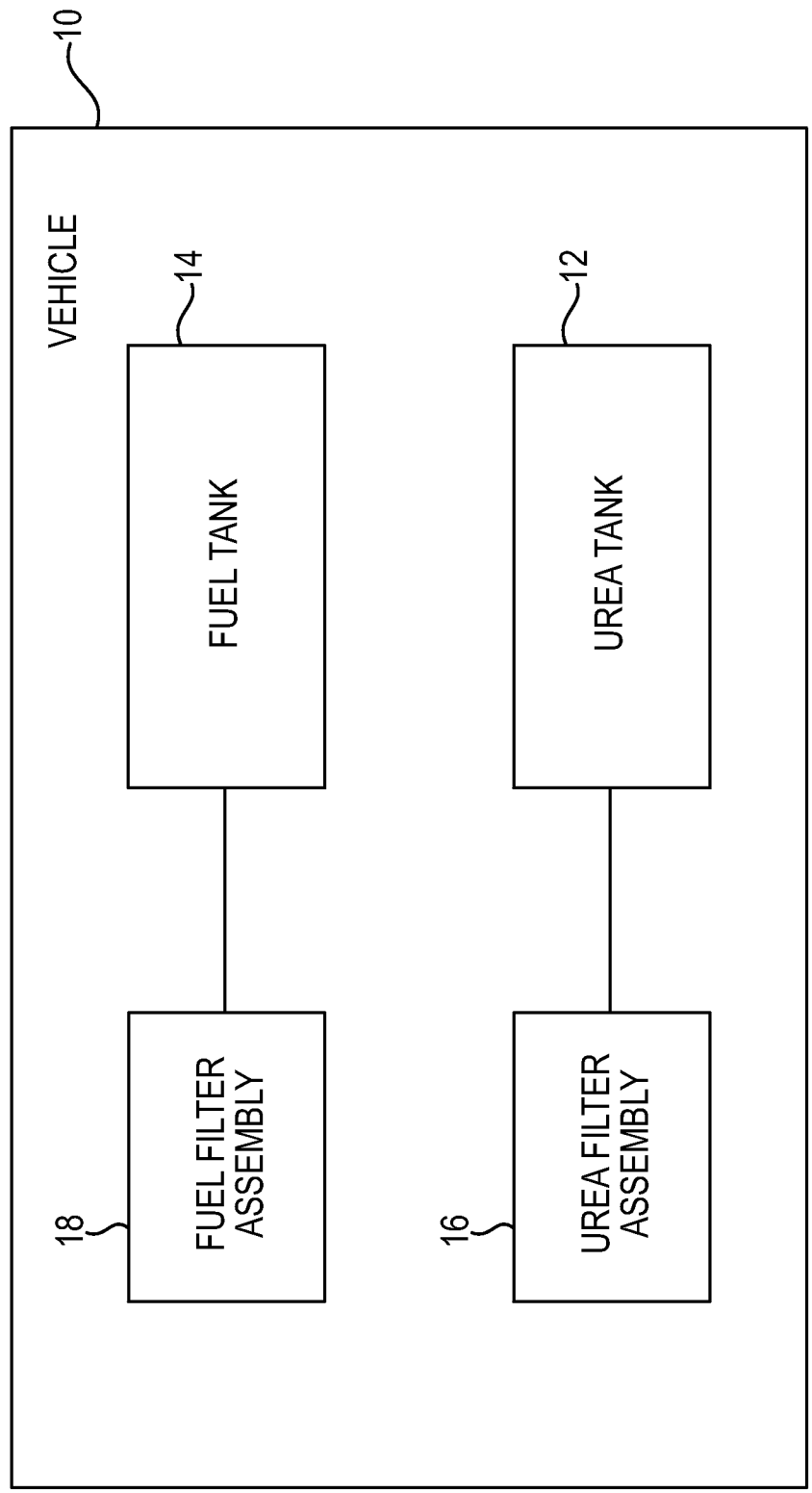
FIG. 1 is a schematic diagram of a vehicle having a fuel filter assembly and a urea filter assembly according to the invention.

Referring to the drawings, and initially to FIG. 1, a vehicle is illustrated generally at reference numeral 10. The vehicle 10 includes a urea tank 12 containing urea, which may be a diesel exhaust fluid that is a mixture of urea and water, for example, for reducing emissions from the vehicle 10 and a diesel tank 14 as is conventional. The urea tank 12 and diesel tank 14 are each connected to a respective filter assembly 16, 18. The urea filter assembly 16 and fuel filter assembly 18 may be provided at any suitable location in the vehicle 10, for example under a cab of the vehicle 10. The filter assemblies 16 and 18 are provided to filter air flowing from an environment to air inlets in the respective tanks 12 and 14 and to prevent fluid, such as water, from entering the respective tanks 12 and 14. The filter assemblies 16 and 18 also prevent urea or diesel fuel exiting the air inlets from degrading filter elements in the assemblies 16 and 18 as will be discussed below.

Figure 2:
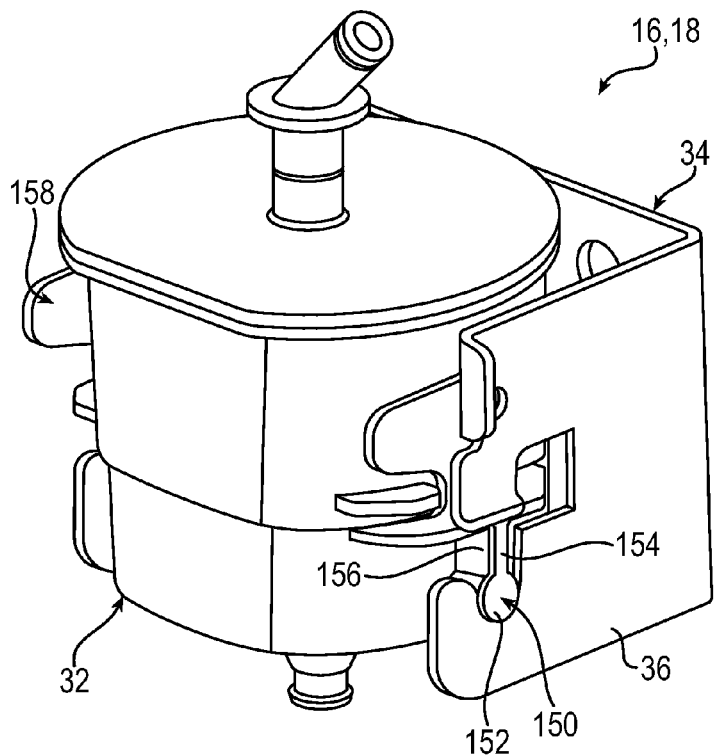
FIG. 2 is a perspective view of the exemplary fuel/urea filter assembly.
Figure 3:
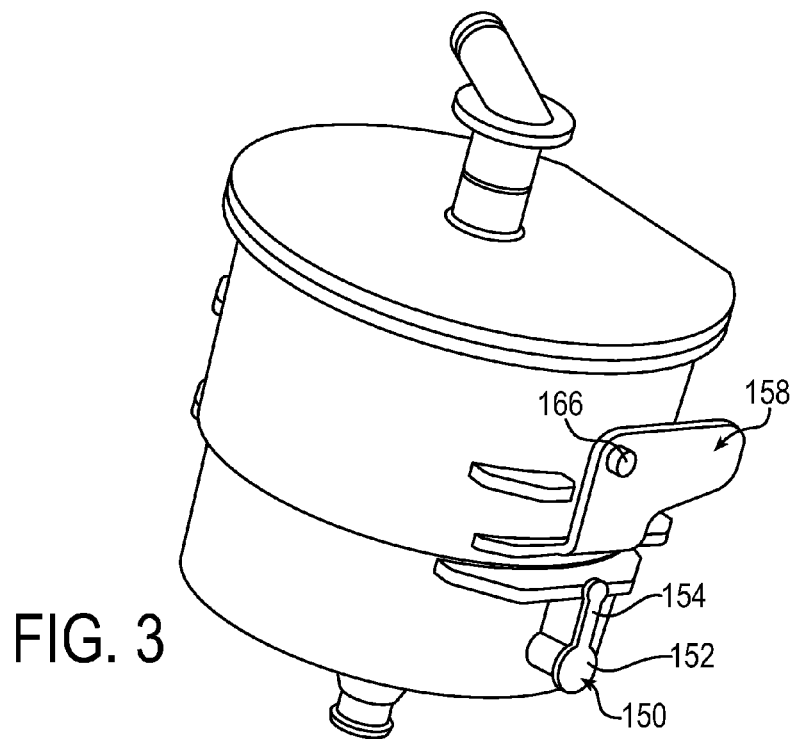
FIG. 3 is a perspective view of an exemplary fuel/urea filter.

Turning now to FIGS. 2 and 3, the filter assemblies 16 and 18, which may be identical, each include a filter 32 and a support bracket 34 with sidewalls 36. The filter 32 includes a structure which enables the filter 32 to be quickly and easily attached to and removed from the bracket 34, which will be described in detail below.

Turning now to FIGS. 4-7, the filter 32 will be discussed in detail. The filter 32 includes a housing 50 circumscribing a central axis A-A and comprising a canister 52 having a lower, closed end 54 and an upper, open end 56. A cover 58 is attached to the open end 56 of the canister 52, and defines an internal chamber 60 therewith. The cover 58 may be attached to the canister 52 in any suitable manner, such as by adhesive. A first port or inlet 62 serving as an air inlet and a fluid/urea outlet is provided, for example, in the closed end 54 to direct air to be filtered into the chamber 60 and to direct fuel/urea exiting the fuel tank 14 or urea tank 12 out of the chamber 60. A second port or outlet 64 serving as an air outlet and a fluid/urea inlet is provided, for example in the cover 58 to direct filtered air from the housing 50 to a downstream component, e.g., the fuel tank 14 or urea tank 12, and to direct fuel/urea exiting the fuel tank 14 or urea tank 12 into the chamber 22. The canister 52 is preferably formed from metal or other appropriate material using conventional processes (e.g., die-casting, machining, etc.).

The filter 32 also includes a filter element 70 disposed within an upper portion of the housing 50, a lower end cap 72 disposed within the housing 50 and supported therein, for example on a shoulder 74 extending inwardly from an interior surface 76 of the canister 52, and a standpipe 78, which may be coupled to cover 58 in any suitable manner or be integrally formed with the cover 58. The filter element 70, which may be an extruded element that is self supported, such as an extruded hydrophilic bonded polyolefin, is sealed at its upper end to the cover 58, which serves as an upper end cap, and at its lower end to the lower end cap 72. In an embodiment, the filter element 70 may be sealingly bonded at its upper and lower end to the cover 58 and lower end cap 72, respectively. The filter element 70 is supported in a recess in the cover or upper end cap 58 that is defined by a radially outer wall 90 and a radially inner wall 92 projecting axially towards the inlet 62. The filter element 70 may be any suitable shape, such as a star-shaped element having a plurality of circumferentially spaced lobes 80, and has an interior surface 82 and an exterior surface 84. The interior surface 82 defines an inner upper chamber 86 and the exterior surface 84 defines with the interior surface 76 of the canister 52 an outer upper chamber 88.

The lower end cap 72 includes a body 100 sealed to the lower end of the filter element 70, such as by bonding, and a tubular portion 102 extending from the body 100 downwards towards the inlet 62. The tubular portion 102 defines a lower chamber 104 and houses a suitable check valve 106, such as an umbrella valve, at its lower end. The check valve 106 includes a stem 108 received in opening 110 in the tubular portion 102, and a sealing portion 112 that seals against one or more openings 114 in the tubular portion 102. The check valve 106 permits the flow of fluid from the fuel tank 14 or urea tank 12 from the lower chamber 104 to the inlet 62, and blocks the flow of air from the inlet 62 to the lower chamber 104.

Figure 4:
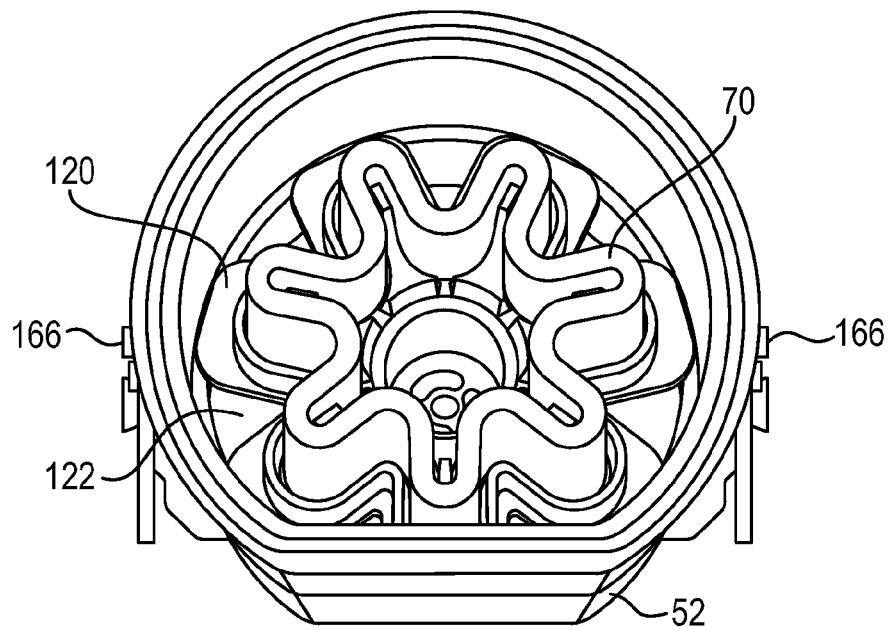
FIG. 4 is a top perspective view of the fuel/urea filter with a cover removed.
Figure 5:
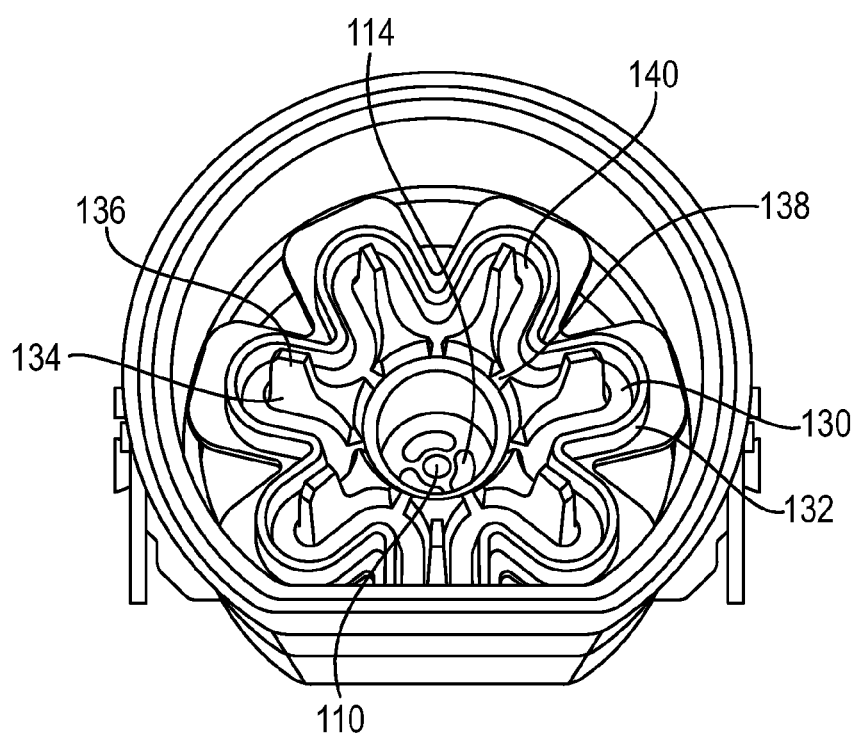
FIG. 5 is a top perspective view of the fuel/urea filter with the cover and a filter element removed.
Figure 6:
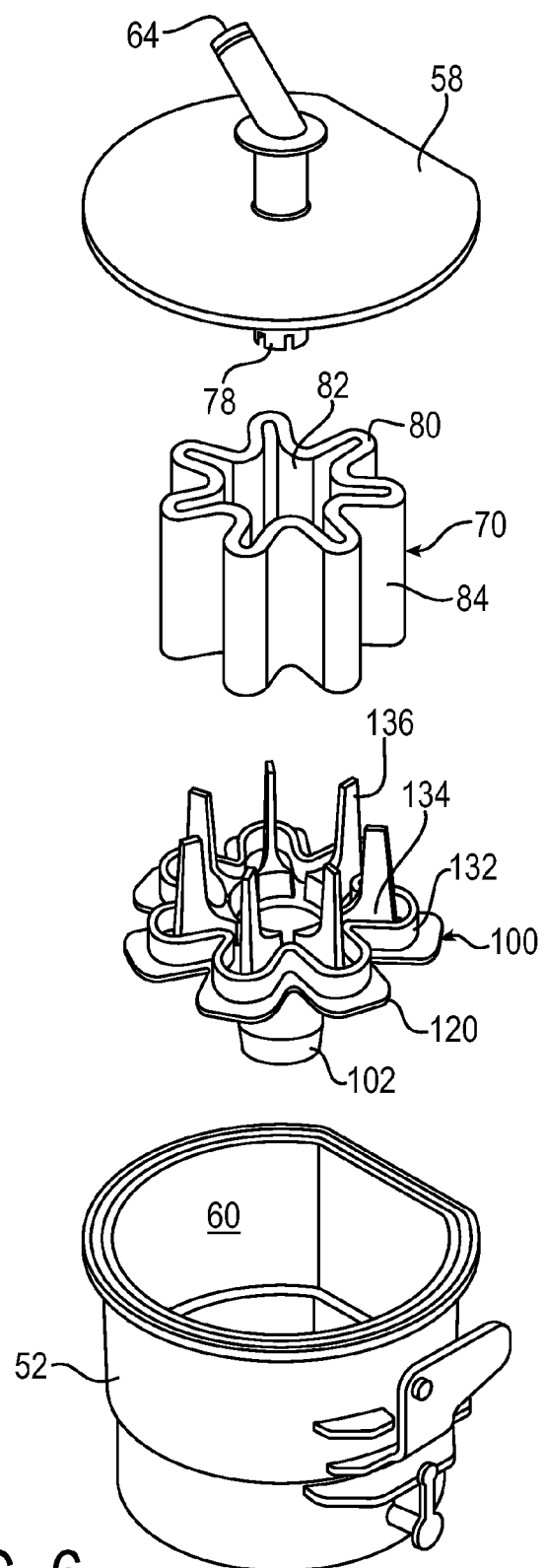
FIG. 6 is an exploded view of the fuel/urea filter.

As best shown in FIGS. 4 and 5, the body 100 includes a plurality of lobe portions 120 circumferentially spaced apart, and a plurality of openings 122 are defined between the interior surface 76 of the canister 52 and the body 100 in-between the lobe portions 120. Air entering the internal chamber 60 via the inlet 62 flows through the openings 122 to the outer upper chamber 88, where the air can flow from outside the filter element 70 through the filter element and into the inner upper chamber 86.

The body 100 also includes a recess 130 for supporting the lower end of the filter element 70. The recess 130 is defined by a radially outer wall 132 and a radially inner wall 134 of the body 100. The radially inner wall 134 substantially covers the lower portion of the filter element 70, such that a lower exposed surface of the filter element 70 is defined about a top of the radially inner wall 134. The radially inner wall 134 includes a plurality of circumferentially spaced axial projections 136 that each prevents a respective lobe 80 of the filter element 70 from collapsing on itself. The radially inner wall 134 also includes a plurality of gutters 138 that allow air at the bottom of the filter element 70 to exit the filter element 70 and flow to the standpipe 78. The plurality of gutters 138 also allow fluid to drain from the filter element 70 to the inlet 62 if any fluid comes in contact with the interior surface 82 of the filter element 70. As shown, the radially inner wall 134 is formed by a plurality of circumferentially spaced wall members 140.

Figure 7:
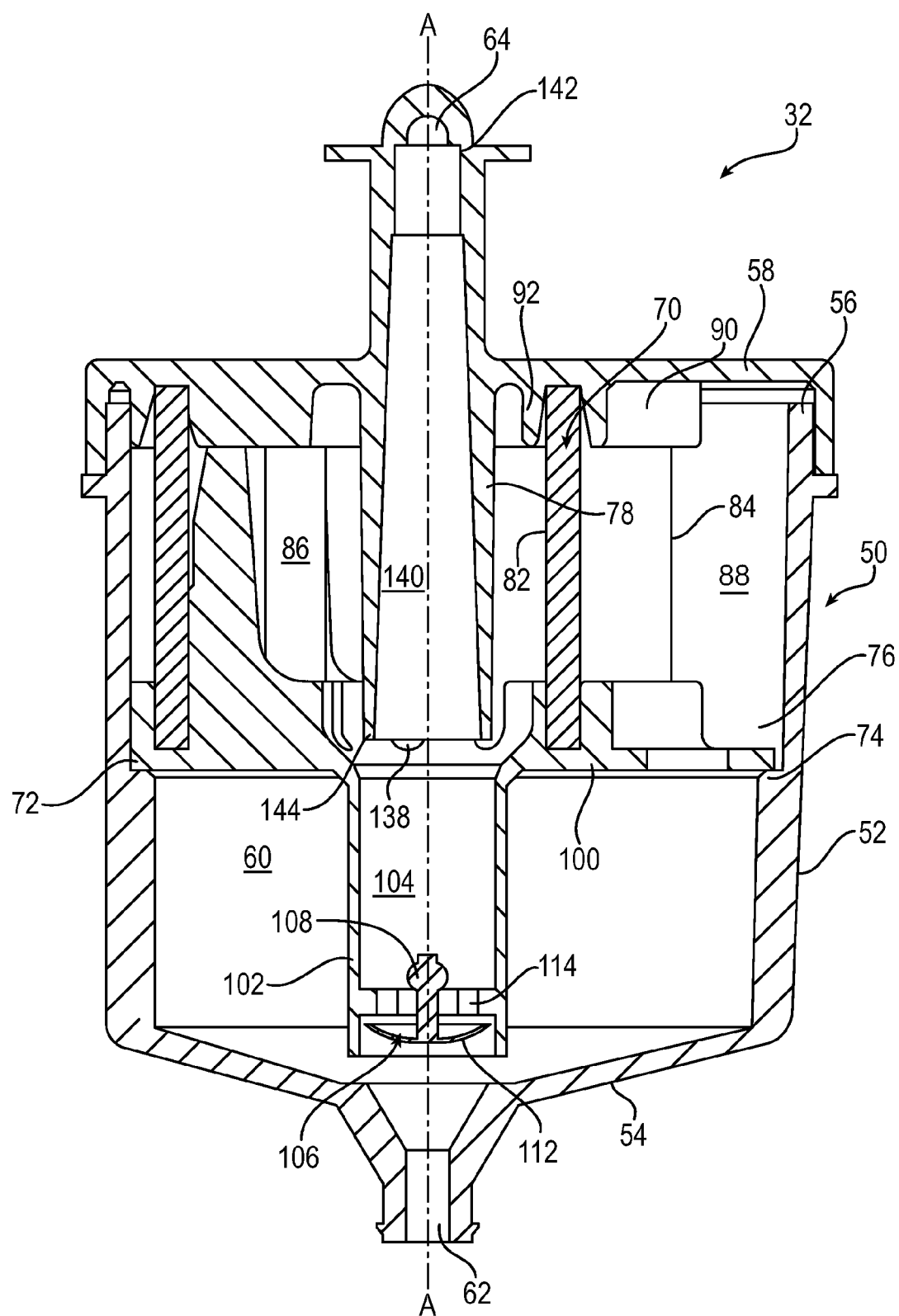
FIG. 7 is a cross-sectional view of the fuel/urea filter.

Referring now to FIG. 7, the standpipe 78 forms a passageway 140 communicating at an upper end 142 with the outlet 64 and at a lower end 144 with the lower chamber 104. It will be appreciated that the outlet 64 may be the upper end 142 of the standpipe. The upper end 142 of the stand pipe extends axially above the cover 58, and the lower end 144 extends axially below the cover 58. The lower end 144 of the standpipe 78 extends through the inner upper chamber 86 and terminates at a point that allows air that flows through the filter element 70 and into the inner upper chamber 86 to flow into the standpipe 78 and to the outlet 64, while preventing fluid flowing from the outlet 64 and through the passageway 140 of the standpipe 78 from coming into contact with the interior surface 82 of the filter element 70.

In an embodiment, the lower end 144 of the standpipe 78 extends through the inner upper chamber 86 to a point no higher than the lower exposed surface of the filter element 70. In an embodiment, the lower end 144 of the standpipe 78 extends through the inner upper chamber 86 to a point below the lower exposed surface of the filter element 70. In an embodiment the lower end 144 of the standpipe 78 may extend to a point below the lower exposed surface of the filter element 70 and above the lower portion of the filter element 70. In an embodiment the lower end 144 of the standpipe 78 may extend to a point below the lower exposed surface of the filter element 70 and terminate at a point approximately the same elevation as the plurality of gutters 138.

As noted above, the filter 32 is provided to filter air flowing from an environment into the air inlet of the urea tank 12 or a diesel tank 14, for example, for filtering dirt and other particulates from the air. The filter 32 also prevents fluid, such as water, from entering the urea tank 12 or the diesel tank 14. When one filter 32 is installed on the vehicle 10 and coupled to the urea tank 12 and another filter is installed on the vehicle 10 and coupled to the diesel tank 14, contaminated air and/or fluid enters each filter 32 at the inlet 62 and flows into the internal chamber 60. As the contaminated air and/or fluid enter the internal chamber 60, the check valve 106 is in a closed position thereby preventing the contaminated air and/or fluid from flowing into the tubular portion 102 of the lower end cap 100 and bypassing the filter element 70. The contaminated air and/or fluid thereby flows through the internal chamber 60, around the tubular portion 102, and through the openings 122 between the interior surface 76 and lobe portions 120 into the outer upper chamber 88.

The contaminated air flows from the outer upper chamber 88 through the filter element 70 where the contaminants are removed from the air, while the fluid is rejected by the filter element 70 and flows back through the openings 122 and out of the filter 32 through the inlet 62. The filtered air then flows out of the filter element 70 into the inner upper chamber 86 and downward towards the lower end 144 of the standpipe 78. The air enters the standpipe 78 at the lower end 144 and flows through the passageway 140 to the upper end 142, where the air exits the filter 32 via the outlet 64 and flows into the air inlet of the respective tank 12 or 14.

The filters 32 coupled to the urea tank 12 and diesel tank 14 are also provided to prevent urea or diesel fuel, respectively, exiting the air inlet of the respective tank 12 and 14 from degrading the respective filter element 70. When the filters 32 are installed on the vehicle 10, urea or diesel exiting the urea tank 12 or diesel tank 14 respectively, for example urea or diesel spilling out of the tanks 12 and 14 due to rough road conditions, exits the respective air inlet and flows to the outlet 64 of the respective filter 32. The urea or diesel enters the respective standpipe 78 at the upper end 142 and flows through the passageway 140 to the lower end 144.

Due to the lower end 144 of the standpipe 78 extending through the inner upper chamber 86 to a point no higher than the lower exposed surface of the filter element 70, the urea or diesel exiting the standpipe 78 at the lower end 144 flows downward into the tubular portion 102 of the lower end cap 100 rather than flowing over the filter element 70. The urea or diesel then flows through the lower chamber 104 to the openings 114 in the tubular portion 102, and the urea or diesel causes the sealing portion 112 of the check valve 106 to unseat from the openings 114 and move to an open position allowing the urea or diesel to flow out of the tubular portion 102 and out of the filter 32 via the inlet 62. In this way, the standpipe 78 protects the filter element 70 from urea or diesel that may saturate the filter element 70 and block airflow over time. For example, the urea is prevented from coming into contact with the interior surface 82, thereby preventing the urea from crystallizing on the interior surface 82 and blocking air flow through the filter element 70.

Referring again to FIGS. 2, 3 and additionally to FIGS. 8 and 9, the attachment of the filter 32 to the support bracket 34 will be described in detail. As noted above, the filter 32 includes a structure which enables the filter 32 to be quickly and easily attached to and removed from the bracket 34. To this end, a pair of identical, radially-outward projecting rigid pivots, indicated generally at 150, are provided on the outer surface of the canister 52, on opposite sides thereof, between about the midpoint and the lower end of the canister 52. The pivots 150 each comprise an enlarged circular head 152 projecting radially outwardly from the canister 52 and a surface extension 154 and which is interconnected to the respective head 152 and is flush (co-planar) with the head 152; that is, the surface extension 154 has the same outer dimension as the head 152. The sides of the surface extension 154 are tapered or angled as at 156, and each surface extension extends axially a short distance along the side surface of the canister 52 toward the open end 56 of the canister 52 from the head 152. As will be explained below, the surface extension 154 provides a stand-off against the sidewalls 36 of bracket 34 when the filter is mounted to the bracket.

The attachment structure further includes a pair of flexible retaining clips as at 158, also provided on the outer surface of the canister 52, on opposite sides thereof. The flexible retaining clips 158 are each in general axial alignment with the respective pivot 150, and can be spaced axially therefrom. Each retaining clip 158 includes a thin, flexible, axially-extending body portion 160, in generally parallel relation to the outer surface of the canister 52, and connected at a base end 162 to the canister 52, and extending axially to a free head end 164 spaced radially-outward from the canister 52. The free end 164 of the clips 158 can be flexibly bent toward the canister by appropriate manual manipulation of the clip 158. A radial projection 166 is also provided on each retaining clip 158 that enables the retaining clip 158 to lock to the respective sidewall 36 of the bracket 34, and hence retain the filter 32 on the bracket 24.

The bracket 34 includes a body 170 with apertures 172 or other means to attach the bracket 34 to an appropriate support surface, such as under the cab of the vehicle 10. The sidewalls 36 of the bracket 34 are each spaced apart from each other along opposite sides of body 170, and run generally parallel to each other and perpendicular to the body 170. The spacing of sidewalls 36 is such that the canister 52 can be generally closely received therebetween. The sidewalls 36 each include a slot, as at 174, along the side edge of the sidewall and toward the lower end thereof, and opening generally toward the upper end of the bracket 34, and a tapered or rounded surface 176 around the upper edge of each slot 174.

An opening 180 or other appropriate geometry is next provided axially upward from the surface 176 on the sidewalls 36 toward the upper end of the bracket sidewalls 36, with opening 180 being dimensioned to receive the projection 166 on the clip 158. The opening 180 provides a catch which retains the upper end of the filter 32 to the bracket 34 when the filter 32 is mounted to the bracket.

During connection of the filter 32 to the bracket 34, as shown in FIGS. 8 and 9, the filter 32 is initially inserted into the bracket 34 such that the pivots 150 are each received in the respective slot 174. The slot 174 receives the base of the pivot 150, and the filter 32 can pivot around this support while the filter 32 is being mounted to the bracket 34, that is, as the filter 32 is being brought into axial alignment with and substantially flush against the body of the bracket 34. As the filter 32 is pivoted, the extension 154 then engages the inside surface of the sidewalls 36 as the tapered sides 156 of the extension 154 pass inwardly against the upper surface 176 of the slot 174; and, along with the head 152 being closely received and supported by a rounded edge on the lower portion of the slot 174, the lower end of the filter 32 is thereby securely held on the bracket 34 when the filter 32 is completely mounted to the bracket as shown in FIG. 2.

As the filter 32 is brought into alignment with the bracket, the retaining clips 158 on the filter 32 are received between the sidewalls 36, and the projections 166 engages the sidewalls 36, and force the clips 158 slightly inwardly until the projections 166 pass into the corresponding openings 180 in the sidewalls 36. Once the projections 166 enter their respective openings 180, the clips 158 flex outwardly and the filter 32 is locked in its horizontal mounting orientation to the bracket 34. The filter 32 can be supported against the body 170 of the bracket, although it can also be held a small distance outwardly therefrom, as the connection with the pivots 150 and with the retaining clips 158 securely hold the filter 32 to the bracket 34 irrespective of whether the filter 32 is supported against the body 170. Hoses can then be connected to the inlet 62 and the outlet 64 of the filter 32 to fluidly connect the filter 32 within the system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter including:
   a housing circumscribing a central axis, the housing having an inlet at a lower end and an outlet at an upper end;
   a filter element disposed within an upper portion of the housing, the filter element having an interior surface defining an inner upper chamber and an exterior surface defining with an interior surface of the housing an outer upper chamber;
   a standpipe forming a passageway communicating at an upper end to the outlet and at a lower end to a lower chamber in the housing below the inner upper chamber, the lower end of the standpipe extending through the inner upper chamber to a point no higher than a lower exposed surface of the filter element; and
   a check valve that permits flow from the lower chamber to the inlet and blocks flow from the inlet to the lower chamber.

2. The filter according to claim 1, wherein the lower end of the standpipe extends through the inner upper chamber to a point below the lower exposed surface of the filter element.

3. The filter according to claim 1, wherein the inlet communicates with the outer upper chamber such that air entering the inlet flows to the outer upper chamber.

4. The filter according to claim 3, whereby air flows from the outer upper chamber though the filter element where particulates are removed from the air and then into the inner upper chamber.

5. The filter according to claim 1, wherein the lower chamber is formed by an annular interior wall radially inwardly spaced from the interior surface of the housing.

6. The filter according to claim 1, further including a lower end cap sealingly bonded to a lower end of the filter element and supported on a shoulder extending inwardly from the interior surface of the housing.

7. The filter according to claim 6, wherein the lower end cap has a body supported on the shoulder and a tubular portion extending from the body downward towards the inlet and defining the lower chamber, and wherein the tubular portion houses the check valve.

8. The filter according to claim 7, further including a plurality of openings defined between the interior surface of the housing and the body of the lower end cap, whereby air flows from the inlet through the openings to the outer upper chamber.

9. The filter according to claim 6, wherein the lower end cap includes a recess for supporting a lower end of the filter element.

10. The filer according to claim 9, wherein the recess is defined by a radially outer wall and a radially inner wall of the lower end cap.

11. The filter according to claim 10, wherein the radially inner wall has a plurality of circumferentially spaced axial projections for preventing lobes of the filer element from collapsing.

12. The filter according to claim 10, wherein the radially inner wall includes a plurality of gutters for allowing fluid to drain from the filter element to the inlet.

13. The filter according to claim 1, wherein the filter element is an extruded filter element.

14. The filter element according to claim 1, wherein the filter element includes a plurality of circumferentially spaced lobes.

15. The filter according to claim 1, wherein the housing includes a canister and a cover coupled to the canister, and wherein the cover serves as an upper end cap and is sealingly bonded to an upper end of the filter element.

16. The filter according to claim 15, wherein the standpipe is integrally formed with the cover.

17. A filter including:
a housing circumscribing a central axis and including:
  a canister having a closed end and an open end, the canister having a first port in the closed end that serves as an air inlet and a fluid/urea outlet;
  a cover attached to the open end of the canister, the cover having a second port that serves as an air outlet and a fluid/urea inlet and a standpipe extending axially from the second port towards the first port; and
a filter element for filtering particulates from air flowing from the first port to the second port, the filter element having an interior surface defining an inner chamber,
wherein the standpipe extends axially through the inner chamber from the second port towards the first port and terminates at a point that allows air that flows from outside the filter element through the filter element and into the inner chamber to flow into the standpipe and to the second port, while preventing fluid flowing from the second port through the standpipe from entering the filter element.

18. The filter according to claim 17, wherein the standpipe extends axially through the inner chamber and terminates at the point no higher than a lower exposed surface of the filter element.

19. The filter according to claim 17, wherein the standpipe terminates at the point below the lower exposed surface of the filter element.

20. A filter connectable to a diesel fuel system or a urea tank system, the filter including:
a housing circumscribing a central axis, the housing having an inlet at a first end and an outlet at a second end, the housing having an upper portion, a lower portion, and inner chamber defined therebetween;
a filter element disposed within the upper portion of the housing; and
a standpipe having an upper portion and a lower portion, the lower portion of the stand pipe extending into the inner chamber from the upper portion of the housing towards the lower portion of the housing and terminating above the lower portion of the housing and below a lower exposed surface of the filter element.

* * * * *